(No Model.)
H. GUTH.
LACTOMETER.
No. 301,445.  Patented July 1, 1884.
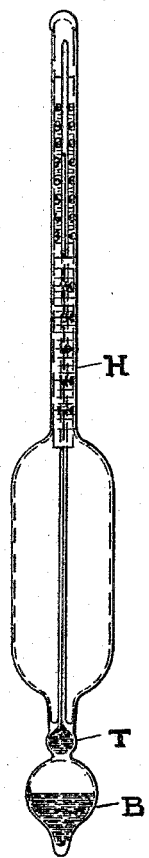
WITNESSES: Herbert W. T. Jenner
Walter J. Watson
Henry Guth INVENTOR

UNITED STATES PATENT OFFICE.

HENRY GUTH, OF NEW YORK, N. Y.

LACTOMETER.

SPECIFICATION forming part of Letters Patent No. 301,445, dated July 1, 1884.

Application filed January 22, 1884. (No model.)

*To all whom it may concern:*

Be it known that I, HENRY GUTH, of the city, county, and State of New York, have invented a certain new and useful Improvement in Lactometers or Instruments for the Testing of Milk by the Specific Gravity; and I do hereby declare that the following is a full, clear, and exact description of the invention, such as will enable others skilled in the art to which it appertains to make and use the same, reference being had to the accompanying drawing, and to letters and figures of reference marked thereon, which form part of this specification, and which drawing represents the improved instrument in about half of its actual size.

My invention relates to certain new and useful improvements in lactometers, the general configuration of which is the same as that of the hydrometer described in an application filed simultaneously herewith.

The object of the present invention is to produce a lactometer having combined therewith a thermometer the bulb of which is retained in direct contact with the milk. It is well known that in order to obtain the true specific gravity of a liquid by the use of any such instrument it is absolutely necessary to apply a correction for the temperature if this is any other than 60° Fahrenheit, for which the scales are constructed by general consent. It is also evident that this correction must be made for the temperature of the liquid exclusively, uninfluenced by the temperature of the surrounding air or other bodies, which may be quite different, as is especially the case with milk usually tested immediately after transportation, and in most seasons of the year in surroundings of a very different temperature than that of the milk. For this reason the usual contrivance made for the purpose, and consisting in a narrow cylinder with a side recess containing a thermometer, and which is covered by a glass, so as to observe its scale, does rarely give the correct temperature of that part of the milk in which the hydrometer floats, and of which it indicates the specific gravity, so that if a correction is made for temperature it may be not the temperature of that part of the milk floating the instrument, but another temperature of another portion, and a false correction is the result. These considerations have convinced me that it is of paramount necessity to inclose the thermometer in the lactometer, not alone, but to make it part and parcel of the same. I am aware that attempts have been made in this direction by a separate thermometer, of which the bulb is inclosed in the wider part of the lactometer, but entirely out of contact with the liquid, so that it takes considerable time for the thermometer to attain the temperature of the liquid, which makes instruments thus constructed impracticable, as the milk-testers cannot afford to spend the time necessary for each sample to affect a thermometer thus situated. They also must not delay the customers. I have therefore conceived the idea to make the thermometer-bulb part and parcel of the weight that ballasts the floating instrument, so that the thermometer is in direct contact with the milk being tested, and will at once indicate the temperature of that portion of the same which floats the instrument, unaffected by the temperature of the surroundings.

In the adjoined drawing, B is the lower bulb ballasting the instrument. T is the smaller thermometer-bulb immediately above the bulb B and in full contact with the liquid. The tube attached to the thermometer-bulb runs upward for the entire length of the instrument, so as to have the scale at the top above the liquid, by which arrangement the temperature can be read off easily, while the specific gravity is indicated by the hydrometer-scale H, immediately under the thermometer-scale. I consider this arrangement of having the thermometer-scale visible above the liquid of great importance for the rapid testing of milk, as this, being an opaque liquid, will make an immersed thermometer-scale invisible. A little book accompanies each of my instruments for the purpose of making the corrections for temperature. It contains tables of the degrees of unskimmed and of skimmed milk, with temperatures from 36° to 86° Fahrenheit, and the corresponding figures in columns for obtaining the true specific gravity for 60° Fahrenheit.

What I claim, and wish to secure by Letters Patent, is—

1. A thermometer combined with a lactometer in such a way that the thermometer-bulb is always in immediate and full contact with that part of the milk in which the instrument floats.

2. A lactometer with two ballasting mercurial bulbs, both in direct contact with the milk, and of which the upper one performs also the additional duty of a thermometer, with its scale above the liquid, so that the single instrument will serve the double purpose of indicating the specific gravity and the temperature at the same time.

3. A combined lactometer and thermometer, consisting of the weighted bulb B, the mercury-bulb T, and having the stem of the thermometer which carries the scale inclosed by the corresponding stem of the lactometer.

In testimony whereof I affix my signature in presence of two witnesses.

HENRY GUTH.

Witnesses:
 GUSTAV SCHNEIDER,
 P. H. VANDER WEYDE.